(No Model.)   W. R. DRUECK.   5 Sheets—Sheet 1.
MACHINE FOR SOLDERING IN VACUO.
No. 394,840.   Patented Dec. 18, 1888.
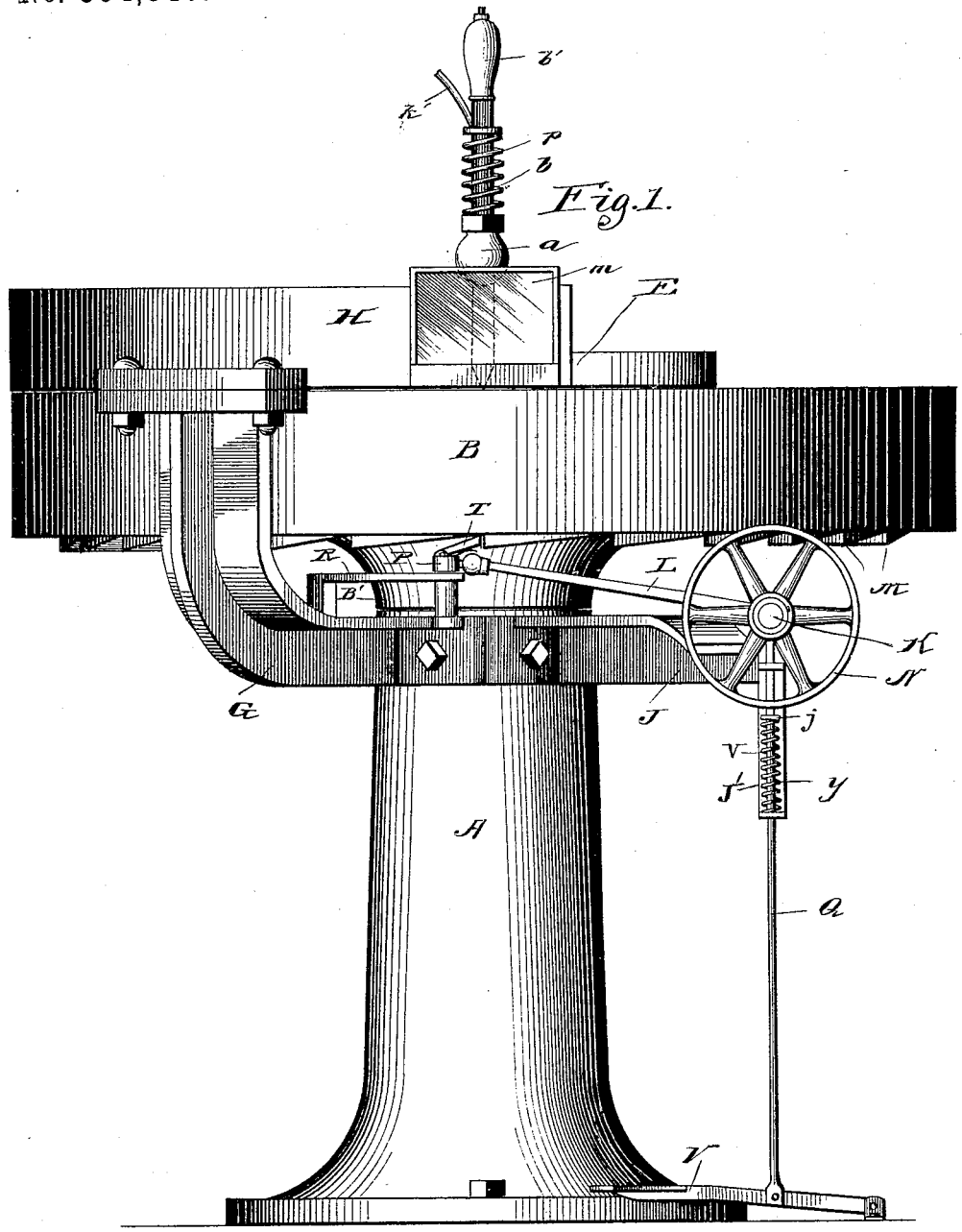

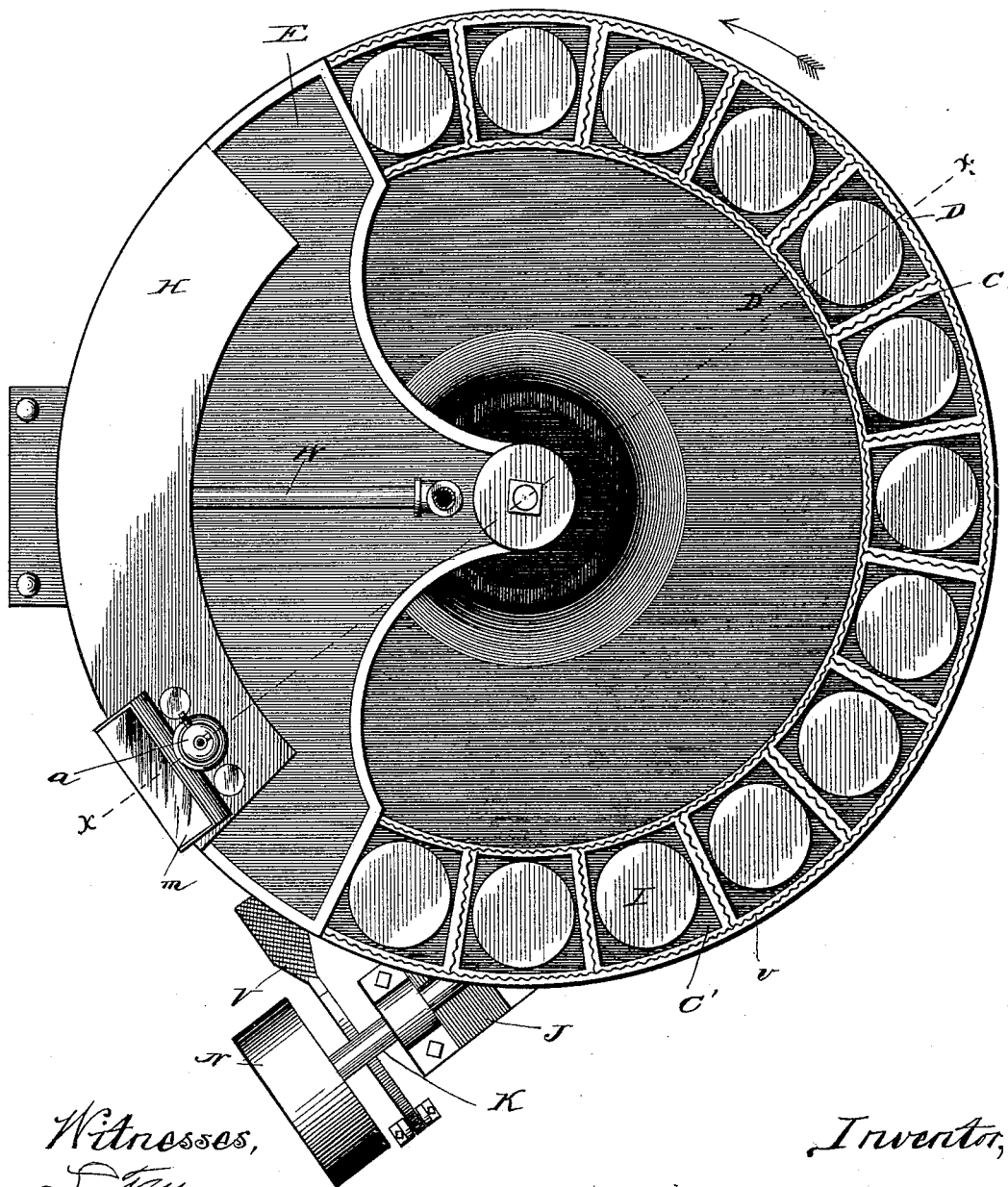

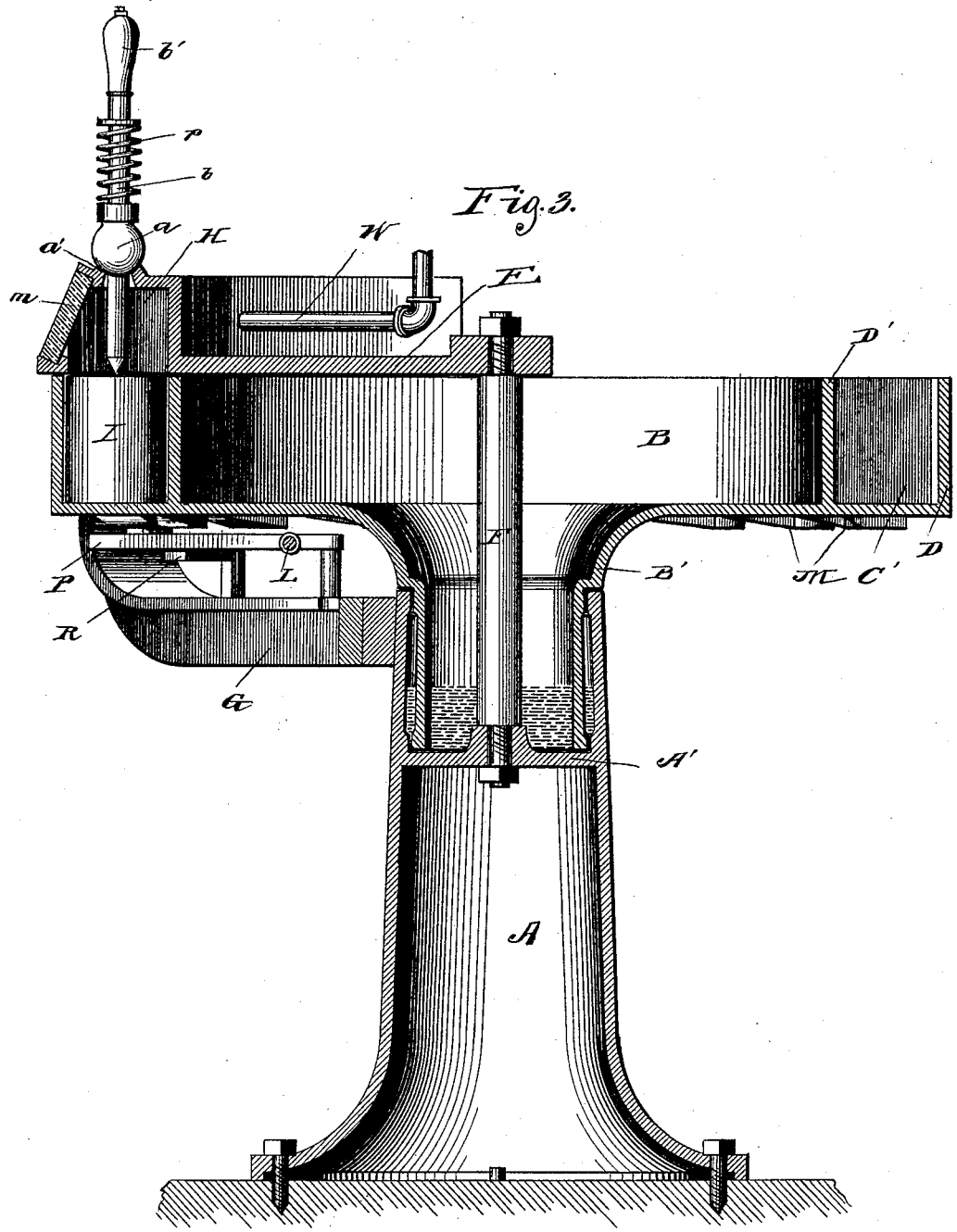

(No Model.) W. R. DRUECK. 5 Sheets—Sheet 4.
MACHINE FOR SOLDERING IN VACUO.
No. 394,840. Patented Dec. 18, 1888.
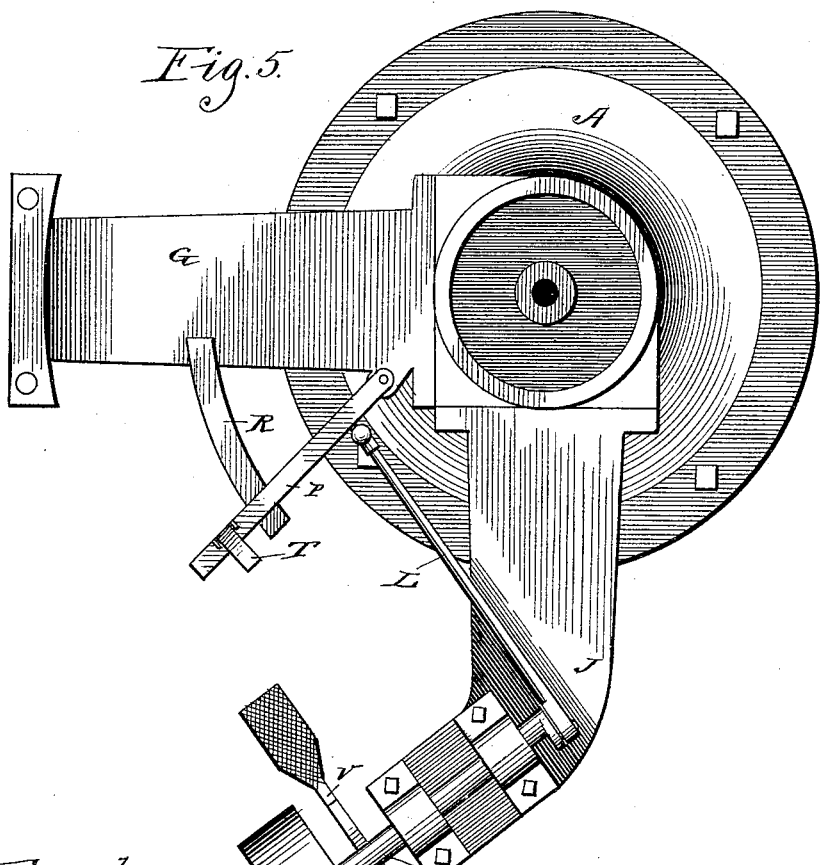
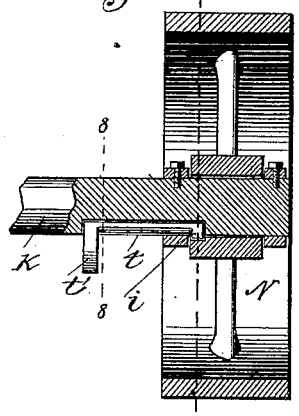
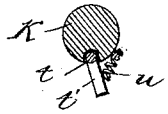
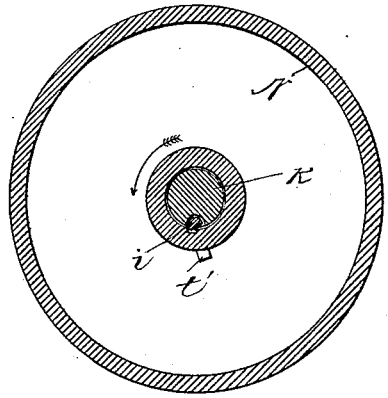
Witnesses,
Inventor,
William R. Drueck,

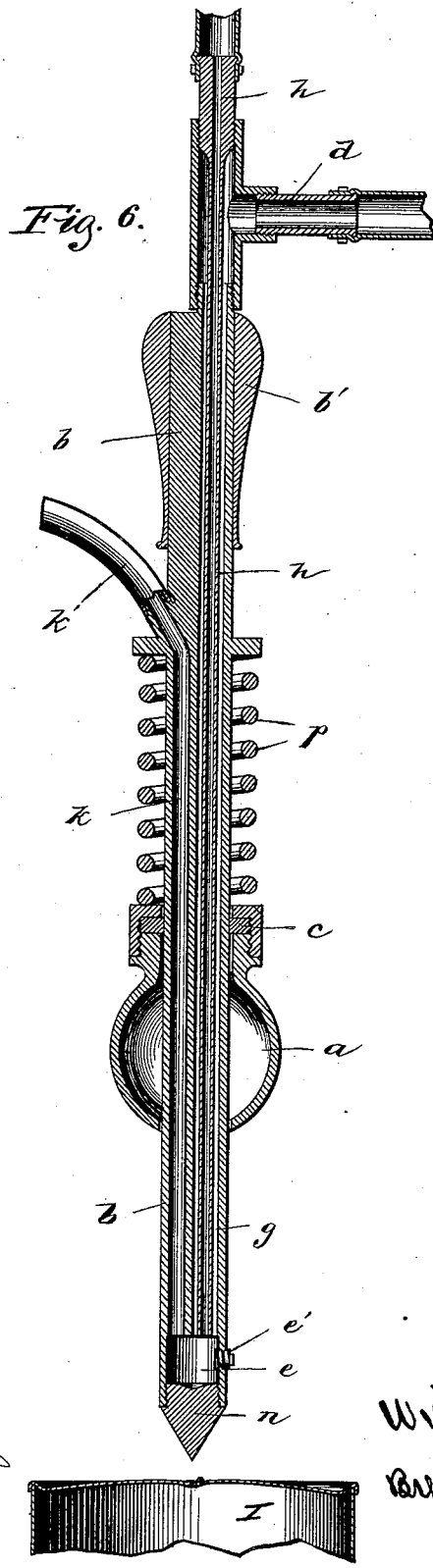

UNITED STATES PATENT OFFICE.

WILLIAM R. DRUECK, OF CHICAGO, ILLINOIS, ASSIGNOR TO NELSON MORRIS, OF SAME PLACE.

MACHINE FOR SOLDERING IN VACUO.

SPECIFICATION forming part of Letters Patent No. 394,840, dated December 18, 1888.

Application filed September 26, 1887. Renewed July 13, 1888. Serial No. 279,898. (No model.)

*To all whom it may concern:*

Be it known that I, WILLIAM R. DRUECK, a citizen of the United States, residing at Chicago, in the county of Cook and State of Illinois, have invented a certain new and useful Improvement in Machines for Soldering *in Vacuo*, which I desire to protect by Letters Patent of the United States, and of which the following is a specification.

The object of my invention is to provide mechanism for soldering cans *in vacuo*, in which the cans are introduced and removed automatically—that is, without the necessity of opening and closing the vacuum-chamber, as heretofore the custom—and, further, to provide improvements in mechanisms, as hereinafter set forth.

The following drawings form a part of this specification, in which—

Figure 1 is an elevation. Fig. 2 is a plan view. Fig. 3 is a vertical section through line $xx$, Fig. 2. Fig. 4 is a section of a pulley, illustrating its application to a shaft. Fig. 5 is a plan with the revolving table and portions above it removed. Fig. 6 is a longitudinal section of a tube used as a soldering-instrument, in which the channels for the introduction of gas and air and for exhaust are shown, and in addition thereto a section of a can; and Fig. 7 is a transverse section through a pulley and shaft. Fig. 8 is a detail.

The supporting-structure is a tubular or hollow standard, A, secured upon a suitable base. A revolving table, B, embracing as a portion of its structure lower plate, B', that terminates cylindrically beneath, is pivotally supported by such termination, in which the latter is seated in the upper end of standard A. A diaphragm, A', of standard A, in conjunction with shoulder of plate B', that rests upon the top of said standard, serves as the bearing for the table. Table B also embraces in its structure an annular portion formed by the outer vertical wall, D, of the table and an inner vertical wall, D'. The space within this annular portion is divided by transverse walls C into several compartments, C', which are adapted to respectively receive a can, I, thus constituting an annular chambered belt. A segmental plate, E, occupies a position upon the upper surface of the annular part of the table. The inner portion of plate E is held in position by a vertical post, F, that has its support in the diaphragm A'. A brace or arm, G, attached to the standard A, extends horizontally beneath the table and curves upwardly exterior to the latter. This arm furnishes a support for the outer portion of plate E.

A portion of plate E—in outline an arc of a circle suited to the annular portion of the table and located over the latter—is suitably shaped by the provision of an elevated portion thereof to form a vacuum-chamber, H. At or near one end of chamber H is provided a seat and opening, $a'$, for the introduction of the soldering appliances. This seat consists of an elevation of the upper wall of chamber H, having a circular opening the boundary of which is concave suitable to form a seat of the ball-and-socket character for a spherical part, $a$, of the soldering appliances.

An aperture through the sphere $a$ is provided, through which a soldering-tube, $b$, extends, the tube being adapted for vertical movement through the sphere. A packing, $c$, is provided in the neck portion of sphere $a$, to afford an air-tight joint. At the lower end of tube $b$ is seated a combustion-chamber, $e$, the location of which when applied to the apparatus is in the vacuum-chamber, as shown in Figs. 3 and 4. In the present example tube $b$ is represented as constructed from a solid rod bored longitudinally to form a passage, $g$, connected at its upper end with the pipe $d$ and at its lower end with the combustion-chamber for the induction of gas. Within this passage is placed a pipe, $h$, terminating vertically, with suitable connections for supplying air to the combustion-chamber. Another passage, $k$, with which a pipe, $k'$, is connected, and communicating also with the interior of the combustion-chamber, affords the necessary exhaust.

A soldering-point, $n$, is provided at the lower end of tube $b$. A spiral spring, $p$, resting upon the shank of sphere $a$ and against the flange of a handle, $b'$, holds tube $b$ normally above the plane of the table-top at a distance convenient for manipulation in the operation of soldering.

To insure a more complete vacuum, the seat for the sphere *a*, and consequently the soldering devices, is placed near the end of chamber H farthest from the approach of the cans as the latter move in their orbit. A glass, *m*, is provided at this part of the chamber to permit inspection of the soldering operation. A pipe, W, connecting with chamber H, is designed for use in exhausting air from said chamber. As one of the elements for the revolving table B, the latter, as shown in inverted view, Fig. 4, and partly shown in other figures, is provided on its under surface, near its circumference, with ratchet projections M. On a horizontal arm, J, secured to standard A are provided suitable bearings for a crank-shaft, K, to the crank of which is attached a pitman, L. On the opposite end of the shaft is secured a pulley, N. Pitman L is connected by a ball-and-socket joint with a lever, P, which latter is pivoted at one of its ends to the arm G. Lever P has a sliding bearing on a bar, R, rigidly connected with arm G.

Near the outer end of lever P is located a hinged pawl, T, beneath which is a spring designed to give the free end of the pawl an upward tendency. Pawl T is suitably located and adapted to engage with ratchets M. The distance between the ratchets, or, rather, their shoulders or vertical portions, corresponds to the distance between can-recesses C'. That table B may be moved a proper distance to bring succeeding cans into position a proper proportion is established between the throw of the crank that actuates pitman L and the distance from the fulcrum of lever P, at which the pitman has its connection with said lever.

Provision is made for obtaining an intermittent movement of the table, in which the intermissions may be optional with the attendant, as shown in detail in Fig. 4. The hub of pulley N on its interior surface and at its inner end has a short groove or seat, *i*.

The end of shaft K is provided with a spline or key, *t*, seated in a groove in said shaft. Within the pulley-hub a shoulder, *i*, of the spline is adapted to engage with a recess on the interior surface of said hub. A spring, *u*, secured to shaft K and to an arm, *t'*, of the spline, holds shoulder *i* normally in the recess of the hub. A rod, Q, is supported in a pendent extension, J', of arm J upon a spring, *y*, seated in said extension and bearing against a flange, *j*, of the rod. Rod Q is normally of such height that its upper end is in contact with arm *t* of the spline, and thus retains shoulder *i* from engaging with the recess of the pulley-hub. Depressing treadle V, attached to rod Q, permits the action of the spring *u* to engage the shaft with the pulley, and thus put the machinery in action.

The upper surface of the annular can-carrier and the lower surface of plate E are ground to give the necessary tightness of joint for exclusion of air, and that those surfaces may at all times be thoroughly lubricated to prevent an adhesion under vacuum of the chamber serpentive grooves *v* are provided in the upper surfaces of the annular walls D and D' and the transverse walls C, which are adapted to hold lubricating-oil. Sphere *a* is firmly held to form a tight joint in its seat by air-compression when a vacuum is produced in chamber H, and yet admits of any lateral movement necessary in directing the soldering-point *n* within the air-chamber to a proper position to effect the purpose of soldering the can. The soldering is effected by melting the pellet of solder that has been previously placed on a vent left in the top of the can to thereby close said vent while the can is in the vacuum. For the purpose of igniting the gas within the combustion-chamber *e* the latter is provided with a plug, *e'*, which is again inserted after the gas is ignited.

In the present illustration of my invention I have provided for the application of power to the operation of the machine. I design, however, to also operate the machine by hand, in which case the mechanism for giving intermittent movement may be of course dispensed with.

Having thus described my invention, what I claim, and desire to protect by Letters Patent, is—

1. In a machine for soldering cans *in vacuo*, a rotatable table provided with an annular series of chambers, and a vacuum-chamber above the table that is segmental to the circle of said chambers, and having its lower surfaces at its extremities adapted to form a close joint with the upper surfaces of the walls of the chamber series.

2. In a machine for soldering *in vacuo*, a rotatable table provided with an annular belt of compartments for receiving cans, and a vacuum-chamber segmental to the circle of said belt located above the latter and adapted to exclude air while the chambers revolve beneath, in combination with soldering appliances, substantially as herein set forth.

3. In a machine for soldering cans in a vacuum, the combination of the table B, having a rotatable bearing in the standard A, the plate E, secured by a central post, F, and an exterior brace or arm, G, the vacuum-chamber H, formed with or upon plate E, and a soldering device embracing a combustion-chamber located within the vacuum-chamber, and a sphere, *a*, suitably seated to form a ball-and-socket joint, all substantially as set forth.

4. In a machine for soldering *in vacuo*, a soldering device embracing in its construction a tube, *b*, a combustion-chamber, *e*, a sphere, *a*, provided with an aperture through which tube *b* extends, and provided with packing *c*, whereby said tube *b* is adapted for vertical movement within the sphere, and a spring, *p*, by which tube *b* has a yielding support, in combination with a chamber having at its top an aperture and a concave recess to receive the soldering-tool, substantially as described.

5. In a machine for soldering *in vacuo*, a revolving table, B, embracing in its construction annular walls D and D' and transverse walls C, which walls are channeled on their upper edges for holding lubricant, in combination with an upper plate, E, having thereon a vacuum-chamber, H, substantially as set forth.

6. In a machine for soldering *in vacuo*, the combination, with a table, B, having a series of chambers for holding cans, and a vacuum-chamber, H, above the table, of ratchets M, arranged circularly and connected with said table, a lever, P, to engage with said ratchets, and mechanism for imparting force intermittently to said lever, substantially as set forth.

W. R. DRUECK.

Witnesses:
A. W. BURNHAM,
J. F. KANE.